United States Patent
Sasaki

(10) Patent No.: US 7,428,377 B2
(45) Date of Patent: Sep. 23, 2008

(54) FOCUSING DRIVE APPARATUS

(75) Inventor: Tadashi Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 482 days.

(21) Appl. No.: 11/205,151

(22) Filed: Aug. 17, 2005

(65) Prior Publication Data
US 2006/0045509 A1    Mar. 2, 2006

(30) Foreign Application Priority Data
Aug. 26, 2004   (JP) .............. 2004-246900

(51) Int. Cl.
  G03B 3/00    (2006.01)
  G03B 17/00   (2006.01)
  G02B 15/14   (2006.01)
  G05B 5/00    (2006.01)
  H02H 7/08    (2006.01)

(52) U.S. Cl. ............... 396/137; 396/82; 359/698; 359/823; 318/446

(58) Field of Classification Search .......... 396/82, 396/89, 137, 133; 348/360, 363, 340; 352/140; 355/56; 356/3; 359/694, 823, 698; 318/446
See application file for complete search history.

(56) References Cited

U.S. PATENT DOCUMENTS

| 4,319,820 A | * | 3/1982 | Ostrowski et al. ........... 396/137 |
| 4,845,521 A |   | 7/1989 | Akashi |
| 4,933,701 A |   | 6/1990 | Matsuyama |
| 5,231,441 A | * | 7/1993 | Hata ........................... 396/82 |
| 5,918,078 A |   | 6/1999 | Imura et al. |
| 6,307,342 B1 |  | 10/2001 | Idemura |
| 6,853,502 B2 |  | 2/2005 | Sasaki ........................ 359/698 |
| 6,992,720 B2 | * | 1/2006 | Kaneda ..................... 348/363 |

FOREIGN PATENT DOCUMENTS

| JP | 2003-241077 A | 8/2003 |
| JP | 2003-337278 A | 11/2003 |

* cited by examiner

*Primary Examiner*—Melissa Jan Koval
(74) *Attorney, Agent, or Firm*—Birch, Stewart, Kolasch & Birch, LLP

(57) ABSTRACT

A focusing drive apparatus includes a determination device that is configured to determine whether a present focusing condition is an AF-able condition or an AF-unable condition. In the AF-able condition, the focusing lens group can be moved to the in-focus position by the AF device. In the AF-unable condition, the focusing lens group cannot be moved to the in-focus position by the AF device. The apparatus also includes a change control device that is configured to set a motive power transmission mechanism in the engaged state to enable the focusing lens group to be moved to the in-focus position by the AF device when the determination device determines that the present focusing condition is the AF-able condition, and to set the motive power transmission mechanism in the disengaged state when the determination device determines that the present focusing condition is the AF-unable condition.

4 Claims, 8 Drawing Sheets

FOCUSING DRIVE APPARATUS

BACKGROUND OF THE INVENTION

1. Field of the Invention

The present invention relates to a focusing drive apparatus and, more particularly, to a focusing drive apparatus capable of manual focusing and automatic focusing.

2. Related Art

In handy cameras mainly for use in television broadcasting, a handy type of lens unit called "ENG lens" is used. The ENG lens has a focusing ring on the front side of a lens barrel. Focusing of the ENG lens can be performed by manually rotating the focusing ring.

A drive device called a drive unit is ordinarily provided on the lens barrel of the ENG lens. The focusing ring can be rotated in an electric drive manner by driving a motor provided in the drive unit, thus enabling focusing by electric drive. Therefore, the ENG lens can be used as an automatic focusing (AF) lens by providing an AF function in the drive unit or the like.

Even in the case of an AF lens, there is a need to enable manual focusing (MF) particularly in broadcasting as well as AF. For example, Japanese Patent Application Laid Open No. 2003-337278 discloses a device for changing the focusing mode between AF and MF by operating a certain switch. On the other hand, professional camerapersons ordinarily have a strong preference to perform MF by operating an operating member such as a focusing ring mechanically connected directly to a focusing lens group. In the above-described ENG lens, the focusing ring and the motor in the drive unit are connected by a clutch. This clutch is disengaged by operating a certain switch to enable an MF operation to be performed by means of the focusing ring.

SUMMARY OF THE INVENTION

However, when the focusing mode is changed between AF and MF by engaging/disengaging (turning on/off) a clutch by means of a certain switch as in the conventional ENG lens, a certain process including an operation to change the focusing mode and time for the process are required and the focusing mode cannot be quickly changed between AF and MF. For example, in a case where AF is executed when necessary, there is a possibility of failure to effectively perform AF if the amount of deviation from the correct focus is large. In such a case, it is necessary for the cameraperson to change the focusing mode from AF to MF by changing the clutch from the on state to the off state and to perform MF. If there is a need to perform focusing with high accuracy in a final stage of focusing, an operation to change the focusing mode from MF to AF by changing the clutch from the off state to the on state is required. Thus, a process including changing the clutch between the on and off states and time for the process are required and it is not possible to quickly obtain correct focus.

In view of the above-described circumstances, an object of the present invention is to provide a focusing drive apparatus which changes the focusing mode between AF and MF by an operation including changing a motive power transmission mechanism such as a clutch between an engaged state and a disengaged state, and which automatically changes the focusing mode from AF to MF when AF cannot be effectively performed at the time of execution of AF, whereby the need for a process to be performed by an operator and time required for the process when the focusing mode is changed between AF and MF is eliminated.

To achieve the above-described object, according to a first aspect of the present invention, there is provided a focusing drive apparatus including a focusing lens group disposed so as to be movable frontward and rearward in an optical axis direction for focusing of a picture taking lens, a motor for driving the focusing lens group, a motive power transmission mechanism changed between an engaged state in which motive power of the motor can be transmitted to the focusing lens group and a disengaged state in which motive power of the motor cannot be transmitted to the focusing lens group, an AF device which moves the focusing lens group to an in-focus position by means of the motor on the basis of contrast in an image of a subject taken through a picture taking optical system, a manual operation device which enables the focusing lens group to be moved by a manual operating force, a determination device which determines whether a present focusing condition is an AF-able condition in which the focusing lens group can be moved to the in-focus position by the AF device or an AF-unable condition in which the focusing lens group cannot be moved to the in-focus position by the AF device, and a change control device which, when the determination device determines that the present focusing condition is the AF-able condition, sets the motive power transmission mechanism in the engaged state to enable the focusing lens group to be moved to the in-focus position by the AF device, and which, when the determination device determines that the present focusing condition is the AF-unable condition, sets the motive power transmission mechanism in the disengaged state to reduce the necessary manual operating force for moving the focusing lens group by means of the manual operation device.

According to the first aspect, when the present focusing condition is an AF-able condition, i.e., a condition in which AF can be effectively performed, the motive power transmission mechanism for transmitting motive power from the motor to the focusing lens group is set in the engaged state and AF is executed. When the present focusing condition is an AF-unable condition, i.e., a condition in which AF cannot be effectively performed, the motive power transmission mechanism is set in the disengaged state to enable manual focusing to be performed by an ordinary operating force. Therefore, it is not necessary for an operator to determine whether or not AF can be effectively performed and to perform an operation for selection between AF and MF according to the result of this determination. The operator can quickly change the operation from AF to MF according to a situation. Also, the operator grips an operation member for MF operation at all times and can easily determine, through a feeling of operation of the operation member, whether or not AF is being effectively performed. When AF is not being effectively performed, the operator can recognize this condition and can quickly change the focusing mode to the MF mode.

According to a second aspect of the present invention, determination by the determination device and change of the motive power transmission mechanism between the engaged state and the disengaged state by the change control device in the focusing drive apparatus in the first aspect are repeatedly executed. According to the present invention, determination as to whether or not AF can be effectively performed is repeatedly performed during AF and MF. If the focusing condition changes during MF so that AF can be effectively performed, the focusing mode is automatically changed to the AF mode.

According to a third aspect of the present invention, on the basis of a change in contrast in the subject image caused when the focus position of the picture taking optical system is changed, the determination device of the focusing drive apparatus in the first aspect determines the present focusing condition as the AF-able condition if the direction of movement of the focusing lens for reaching the in-focus position can be detected, and determines the present focusing condition as the AF-unable condition if the direction of movement of the focusing lens for reaching the in-focus position cannot be detected. The present invention in this aspect has a form of determination as to whether or not the focusing system is in an AF-able condition.

According to a fourth aspect of the present invention, the AF device of the focusing drive apparatus separates subject light for automatic focusing from subject light which enters the picture taking optical system to be incident on an image pickup surface of a picture image pickup device for imaging a subject image to be recorded or reproduced, takes subject images formed by imaging the subject light for automatic focusing through a plurality of AF image pickup surfaces placed at such positions that the lengths of the optical paths to the AF image pickup surfaces are different from each other, and moves the focusing lens group to the in-focus position by comparing contrasts in the subject images taken through the AF image pickup surfaces, and on the basis of comparison between the contrasts in the subject images taken through the AF image pickup surfaces, the determination device of the focusing drive apparatus in the first aspect determines the present focusing condition as the AF-able condition if the direction of movement of the focusing lens for reaching the in-focus position can be detected and determines the present focusing condition as the AF-unable condition if the direction of movement of the focusing lens for reaching the in-focus position cannot be detected. The present invention in this aspect has a form of determination as to whether the focusing system is in an AF-able condition in AF based on an optical-path-difference method.

The focusing drive apparatus according to the present invention is capable of automatically changing the focusing mode from AF to MF if AF is not effectively performed when AF is executed, thereby eliminating the need for a process including an operation for changing the focusing mode between AF and MF and time required for the process.

DETAILED DESCRIPTION OF THE PREFERRED EMBODIMENTS

A preferred embodiment of a focusing drive apparatus in accordance with the present invention will be described with reference to the accompanying drawings.

Figure 1:
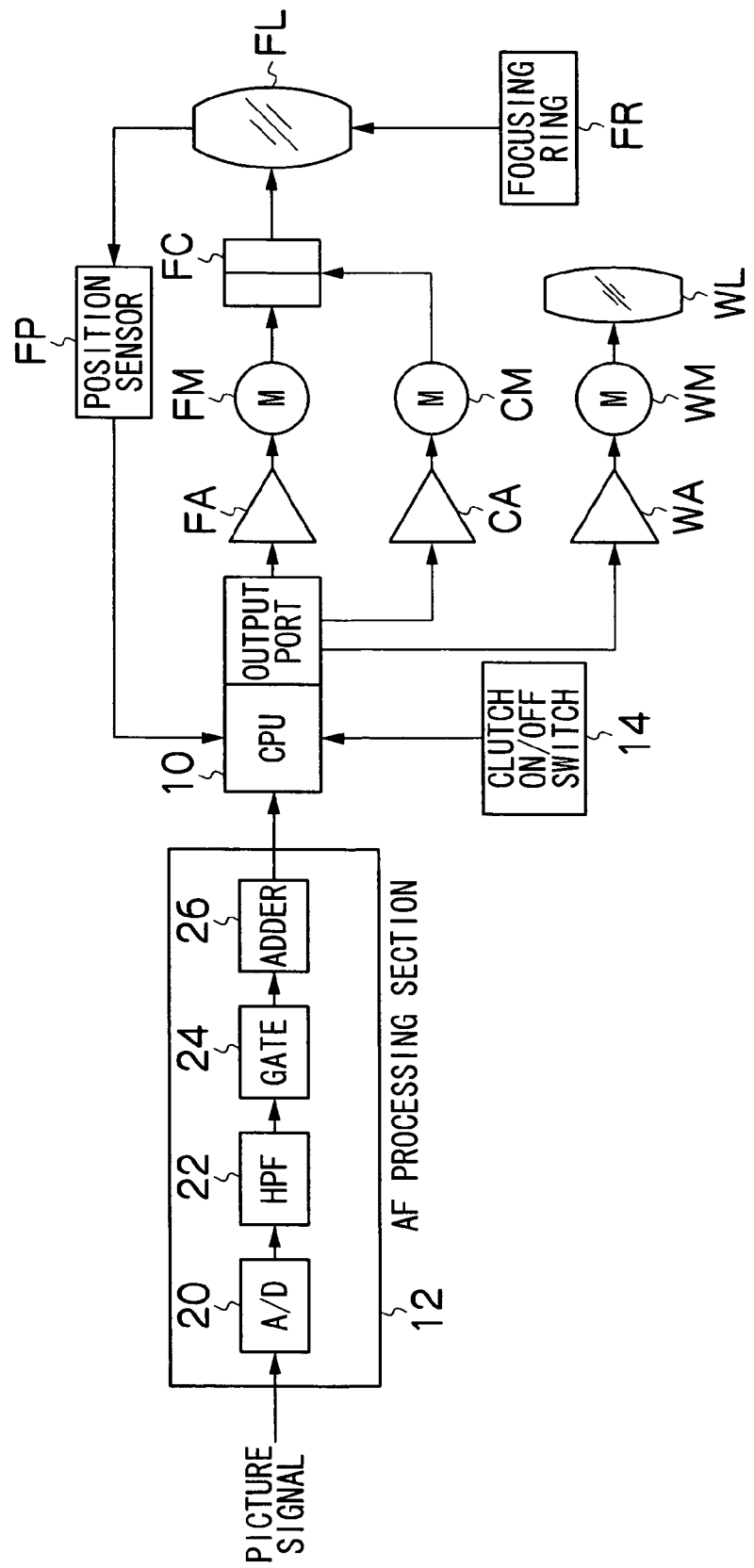
FIG. 1 is a block diagram showing the construction of a focusing drive apparatus in accordance with the present invention.

FIG. 1 is a block diagram showing the configuration of a focusing drive apparatus in accordance with the present invention. The focusing drive apparatus shown in FIG. 1 is an apparatus relating to a picture taking lens (e.g., an ENG lens) used in a handy camera (ENG camera) mainly for use in television broadcasting. The focusing drive apparatus is constituted by a focusing lens (group) FL disposed in a lens barrel of a picture taking lens so as to be movable frontward and rearward in the optical axis direction to perform focusing, a wobbling lens (group) WL disposed so as to be movable frontward and rearward in the optical axis direction to perform wobbling, a focusing ring FR rotatably placed around a peripheral portion of the lens barrel, and components disposed in a drive unit provided on a side portion of the lens barrel.

In the drive unit are disposed a focusing motor FM for driving the focusing lens FL, a clutch FC incorporated in a motive power transmission mechanism for transmitting motive power from the focusing motor FM to the focusing lens FL, a clutch motor CM for changing the clutch FC between an engaged state (on state) or a disengaged state (off state), a wobbling motor WM for driving the wobbling lens WL, a central processing unit (CPU) 10 which executes a below-described process relating to control of focusing and the clutch FC, an AF processing section 12 which detects focusing information (focus evaluation value information) at the time of focusing, and other components.

The focusing lens FL is moved frontward and rearward in the optical axis direction in the lens barrel. Focusing of the picture taking lens is performed by adjusting the position of the focusing lens FL. When a clutch on/off switch 14 is turned off, the clutch motor CM is driven by a control signal output from an output port of the CPU 10 to a clutch amplifier CA, thereby setting the clutch FC in the off state. At this time, the focusing motor FM is disconnected from the focusing lens FL to enable the focusing ring FR to be manually rotted by an ordinary operating force and to enable the focusing lens FL mechanically connected to the focusing ring FR to be moved by the manual operating force. The state in which the clutch FC is off will be referred to as manual focusing (MF) state.

When the clutch on/off switch 14 is turned on, the clutch FC is turned on by the control signal output from the output port of the CPU 10 to the clutch amplifier CA to connect the focusing motor FM so that motive power can be transmitted from the focusing motor FM to the focusing lens FL. Therefore, when the focusing motor FM is driven by the control signal output from the output port of the CPU 10 to the clutch amplifier CA, the focusing lens FL is moved by the motive power of the focusing motor FM. Information on the position of the focusing lens FL is detected by a position sensor FP and supplied to the CPU 10.

For example, the mechanism in an actually implemented state is such that the focusing motor FM is connected to the focusing ring FR and focusing lens FL is driven by the focusing motor FM rotating the focusing ring FR. The clutch FC brings its members separated from each other in the off state in its mechanism into contact with each other when it is in the on state to transmit motive power by the frictional force between the members. Even when the clutch FC is in the on state, it is possible to manually rotate the focusing ring FR by causing the clutch members to slip on each other against the frictional force. However, the force necessary for rotating the focusing ring FR when the clutch FC is in the on state is larger than that when the clutch FC is in the off state.

When the clutch on/off switch 14 is set in the on state, automatic focusing (AF) can be performed. This condition will be referred to as "AF mode".

The wobbling lens WL is disposed, for example, in a rear section of the lens barrel (at the rear of a diaphragm). When the wobbling motor WM is driven by a control signal output from the output port of the CPU 10 to a wobbling amplifier WA, the wobbling lens WL is moved frontward or rearward in the optical axis direction. The wobbling lens WL is used to finely change the focus, for example, for determination as to the focusing direction in AF, as described below.

Processing in the AF mode will be described in detail. A picture signal representing a picture (an image of a subject) taken by the camera in which this lens barrel is mounted is supplied from the camera to the drive unit. The picture signal is input to the AF processing section 12.

The picture signal input to the AF processing section 12 is first converted into a digital signal by an A/D converter 20. From the digital picture signal, a high-frequency-component signal is extracted by a high-pass filter (HPF) 22. The high-frequency-component picture signal is input to a gate circuit 24. Only the picture signal in the region corresponding to a predetermined AF area set in the frame (e.g., a rectangular area at a center of the frame) is thereby extracted. The picture signal in the AF area extracted is input to an addition circuit 26 and is totalized on a frame-by-frame basis (field-by-field basis). The totalized value represents the degree of contrast in the subject image in the AF area taken by the camera and is referred to as "focus evaluation value" in this specification.

The CPU 10 executes processing in the AF mode while obtaining as focus information the focus evaluation value thus obtained by the AF processing section 12.

Processing in the AF mode in the CPU 10 will be described with reference to the flowchart of FIG. 2. When the power supply and the clutch on/off switch 14 are on, the CPU 10 executes processing in the AF MODE. The arrangement may be such that a mode other than the AF mode can be selected when the clutch on/of switch 14 is on. In such a case, processing in the AF mode is executed when the clutch on/off switch 14 is on and when the AF mode is selected by a certain switch. In the AF mode, the CPU 10 first performs necessary initialization (step S10) and thereafter executes processing other than that for focusing (step S12). The CPU 10 also controls zooming and iris, for example.

Subsequently, the CPU 10 executes wobbling (step S14). That is, the CPU 10 drives the wobbling motor WM to finely vibrate the wobbling lens WL to and fro with respect to a reference position, thereby finely vibrating the focus point between the nearside and infinity side. While causing the wobbling lens WL to vibrate, the CPU 10 obtains from the AF processing section 12 the focus evaluation value at a position (near-side position) to which the wobbling lens WL is displaced on the near side with respect to the reference position during wobbling of the wobbling lens WL and the evaluation value at a position (infinity-side position) to which the wobbling lens WL is displaced on the infinity side.

The CPU 10 then determines whether or not the focusing system is in an AF-able condition in which AF can be effectively performed on the basis of the focus evaluation value at the near-side position and the focus evaluation value at the infinity-side position (step S16). That is, the CPU 10 compares the focus evaluation value at the near-side position and the focus evaluation value at the infinity-side position and determines whether the correct focus is achieved or the focusing system is in such a condition as to detect the focusing direction. For example, if the difference between the focus evaluation value at the near-side position and the focus evaluation value at the infinity-side position is small enough to be regarded as zero, and if each focus evaluation value is equal to or smaller than a predetermined threshold value (a level apparently different from that corresponding to the correct focus), the CPU 10 determines that the focusing system is not in an AF-able condition (the focusing system is in an AF-unable condition). In other cases, the CPU 10 determines that the focusing system is in an AF-able condition.

Figure 3:
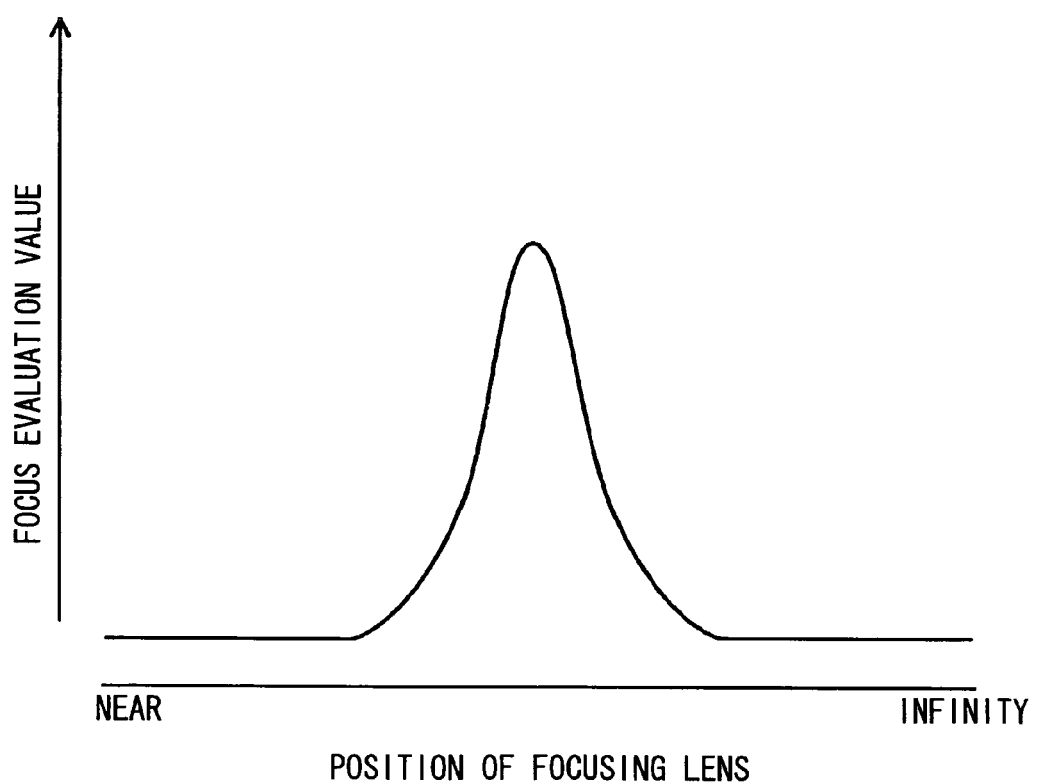
FIG. 3 is an example of a graph of the focus evaluation value obtained at each focusing lens position when a focusing lens is assumed to move from the nearest end to the infinity end while a picture of a certain subject is being taken.

FIG. 3 is an example of a graph of the focus evaluation value obtained at each focusing lens position when the focusing lens FL is assumed to move from the nearest end to the infinity end while a picture of a certain subject is being taken. In the graph of the focus evaluation value shown in FIG. 3, a peaked distribution is exhibited in the vicinity of the in-focus point at which the focus evaluation value is maximized. When the deviation of the position of the focusing lens from the in-focus point is large, the focus evaluation value is substantially constant and small.

If the difference between the focus evaluation value at a near-side position and the focus evaluation value at an infinity-side position is small enough to be regarded as zero while the above-described wobbling is being performed, it can be understood that the position of the focusing lens (wobbling start position) corresponds to the in-focus point or at a large distance from the in-focus point. If each focus evaluation value is small, i.e., equal to or smaller than the predetermined threshold value, it is determined that the position of the focusing lens is at a large distance from the in-focus point, and that the focusing direction cannot be determined, that is, the focusing system in an AF-unable condition.

On the other hand, if the difference between the focus evaluation value at the near-side position and the focus evaluation value at the infinity-side position is small enough to be regarded as zero, and when each focus evaluation value is larger than the threshold value, it is determined that the wobbling start position corresponds to the in-focus point, and that the focusing system is in an AF-able condition. Also, if the difference between the focus evaluation value at the near-side position and the focus evaluation value at the infinity-side position is not small enough to be regarded as zero, it can be understood that the position of the focusing lens is in a sloped region of the peaked distribution. In this case, it is possible to know the direction of the in-focus point (focusing direction) from the magnitude relationship between the focus evaluation value at the near-side position and the focus evaluation value at the infinity-side position, and it is determined that the focusing system is in an AF-able condition.

Figure 2:
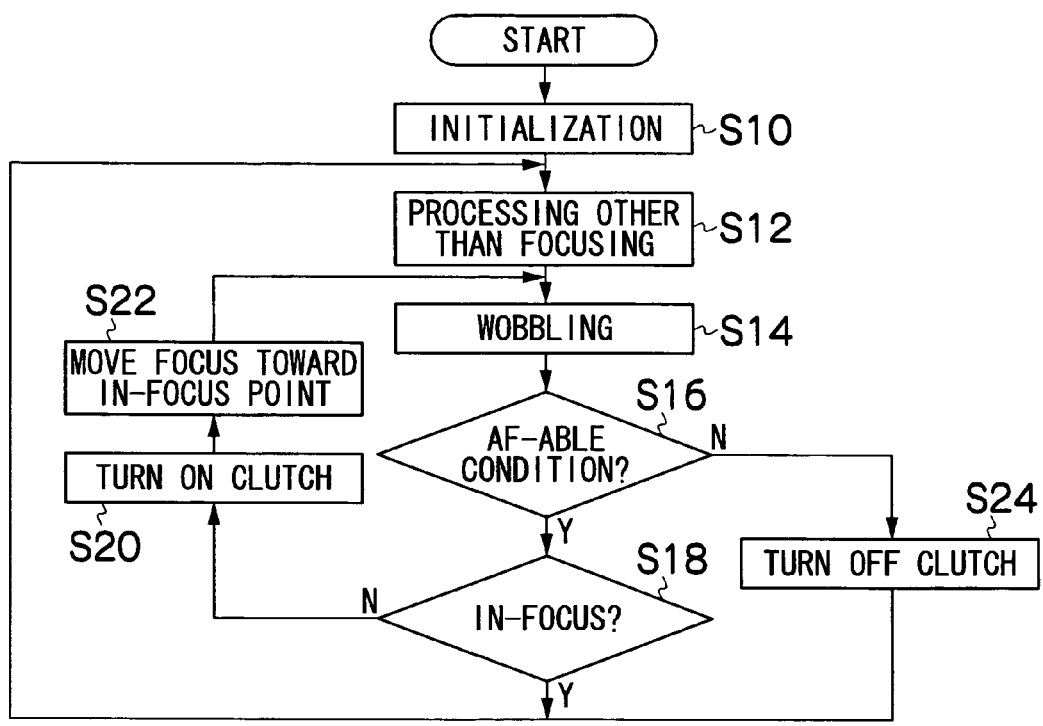
FIG. 2 is a flowchart showing a procedure of processing in an AF mode in a CPU.

If the result of determination in step S16 shown in FIG. 2 is YES, the CPU 10 then determines whether or not the correct focus has been achieved on the basis of the focus evaluation values detected by the above-described wobbling (step S18). If the result of determination is NO, the CPU 10 sets the clutch FC in the on state (step S20) and moves the focusing lens FL in the focusing direction by a predetermined amount or at a predetermined speed on the basis of the focus evaluation values obtained by the above-described wobbling (step S22). The process then returns to step S14.

If the result of determination in step S18 is YES, that is, it is determined that the correct focus has been achieved, the process returns to step S12.

If the result of determination in step S16 is NO, that is, it is determined that the focusing system is in an AF-unable condition, the CPU 10 sets the clutch FC in the off state and changes the focusing mode to the MF mode (step S24), thereby enabling the operator to perform focusing by manually operating the focusing ring FR in the case where AF cannot be performed. After step S24, the CPU 10 returns the process to step S12 and repeats the processing from step S12.

Even in the case where the clutch FC is set in the off state in step S24, wobbling is performed in step S14. If the focusing system has been made AF-able by the operation of the focusing ring FR by the operator, and if the result of determination in step S16 is YES, the state of the clutch FC is thereafter changed to the on state and the focusing lens FL is moved to the in-focus point by AF. If the focusing system in an AF-unable condition, the MF mode is maintained with the clutch FC in the off state.

By the above-described processing in the AF mode, the clutch FC is automatically set in the off state in a situation where AF cannot be effectively performed as in the case of a large deviation from the correct focus. When the operator feels that the focusing ring is made lightly operable, he or she can recognize the situation where AF cannot be performed. At this time, the operator can perform MF by manually operating the focusing ring FR without performing the operation for changing the state of the clutch FC to the off state. Further, when the focusing lens FL is moved to a position in the vicinity of the in-focus point by manually operating the focusing ring FR, the state of the clutch is automatically changed to the on state to enable focusing in the AF mode.

Even when the clutch FC is in the on state and when AF is being effectively performed, the focusing ring can be forcibly rotated manually for MF by an operating force larger than that when the clutch FC is in the off state. For example, the focusing lens FL can be manually moved to and stopped at a position different from the in-focus point to which the focusing lens FL is adjusted by AF. Also, in a case where a plurality of in-focus points exist, the focusing lens FL can be guided to an in-focus point different from the in-focus point to which the focusing lens FL is adjusted by AF.

In the above-described embodiment, a forcible-MF button may be provided. The clutch FC is maintained in the off state when the forcible-MF button is being pressed. In this state, the focusing ring can be rotated by the ordinary operating force. Also, the torque of the clutch FC may be adjusted to enable the focusing ring FR to be easily rotated manually even when the clutch FC is in the on state.

While the embodiment has been described with respect to a case where the picture taking lens has the wobbling lens WL, wobbling can be performed by causing the focusing lens FL to vibrate finely even in a case where the picture taking lens is not provided with the wobbling lens WL. Also in such a case, processing in the AF mode can be performed in the same manner as in the above-described embodiment. In such a case, there is a need to temporarily change the state of the clutch FC to the on state when wobbling is performed in step S14, for the purpose of enabling determination as to whether the focusing system has been made AF-able.

Determination as to whether or not the focusing system has been made AF-able in the case where it is determined in step S16 that the focusing system is in an AF-unable condition and where the clutch FC is in the off state may be made on the basis of focus evaluations values obtained when the focusing lens FL is being moved by the MF operation without performing wobbling. This method has the advantage of eliminating the need for setting the clutch FC in the on state for enabling wobbling in a case where the picture taking lens is not provided with the wobbling lens as described above.

Figure 4:
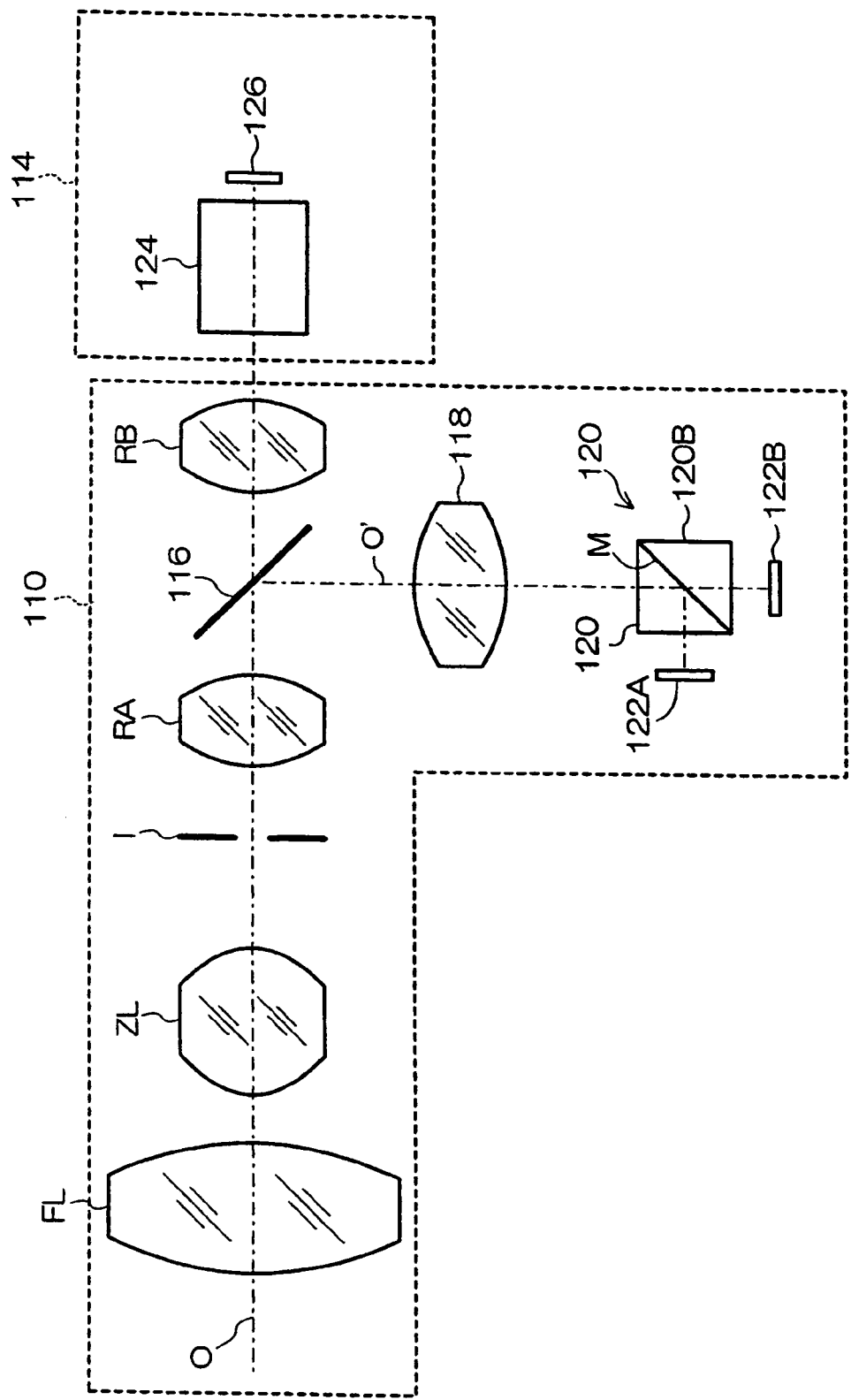
FIG. 4 is a diagram showing the construction of a picture taking lens (optical system) used in AF based on an optical-path-difference method.

An embodiment of the present invention in the case of application to a focusing drive apparatus which performs AF based on an optical-path-difference method will be described. FIG. 4 is a diagram showing the construction of a picture taking lens (optical system) used in AF based on an optical-path-difference method.

In a picture taking lens 110, a focusing lens (group) FL, a zoom lens (group) ZL, a diaphragm I and a relay lens (relay optical system) formed of a front relay lens (group) RA and a rear relay lens (group) RB are disposed in this order in the main optical path along an optical axis O. Each of the focusing lens FL and the zoom lens ZL is a lens group capable of moving in the optical axis direction. When the focusing lens FL is moved, the focus position (subject distance) is changed. When the zoom lens ZL is moved, the image magnification (focal distance) is changed. The diaphragm I operates by opening and closing and the brightness of an image is changed according to the degree of opening of the diaphragm I.

Light from a subject enters the picture taking lens 110, passes through the optical system of the main optical path and enters a camera body 114. In the camera body 114 are disposed a color decomposition optical system 124 for decomposing subject light entering through the picture taking lens 110 into three wavelengths of light corresponding to three colors: red (R), green (G) and blue (B) and R, G and B picture image pickup devices (e.g., CCDs) for taking color-decomposed subject light images of these colors. In this specification, one picture image pickup device 126 represents the R, G and B picture image pickup devices placed at positions defined by optical wavelengths optically equivalent to each other, as shown in FIG. 4. Subject light entering the image pickup surface of the picture image pickup device 126 is photoelectrically converted. A recording or reproduction picture signal is produced by this conversion and processing in a predetermined signal processing circuit in the camera body 114.

A half mirror 116 is placed between the front relay lens RA and the rear relay lens RB in the relay optical system of the picture taking lens. The half mirror 116 forms an AF optical path branching off from the main optical path of the picture taking lens 110. Subject light passing through the half mirror 116 travels through the main optical path along the optical axis O as main-path subject light to directly enter the camera body 114. Subject light reflected by the half mirror 116 is introduced as subject light for AF into an AF optical path along an optical axis O' generally perpendicular to the optical axis O.

A relay lens (group) 118 equivalent to the above-mentioned rear relay lens RB, a light splitting optical system 120 formed of two prisms 120A and 120B, and AF image pickup devices 122A and 122B are placed in the AF optical path. Subject light reflected by the half mirror 116 and introduced into the AF optical path passes through the AF relay lens 118 and enters the light splitting optical system 120. The subject light entering the light splitting optical system 120 is divided into two equal amounts of subject light by a half mirror surface M at a junction between the first prism 120A and the second prism 120B. The subject light reflected by the half mirror surface M enters the image pickup surface of the AF image pickup device 122A, while the subject light transmitted through the half mirror surface M enters the image pickup surface of the other AF image pickup device 122B.

Figure 5:
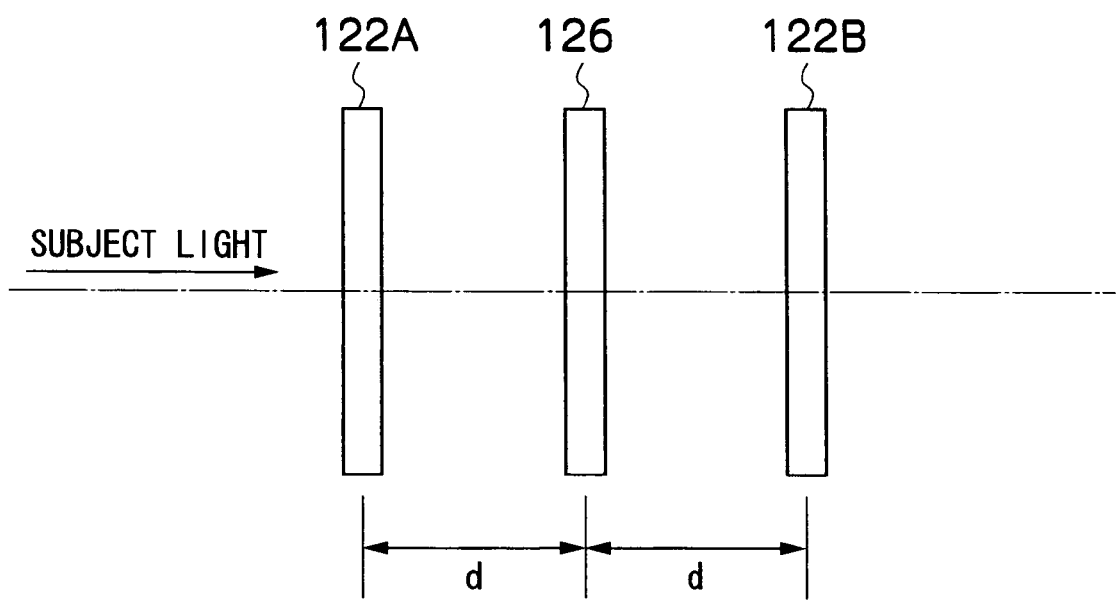
FIG. 5 is a diagram in which a picture image pickup device in a camera body and AF image pickup devices are shown on one optical axis.

FIG. 5 is a diagram in which the picture image pickup device 126 in the camera body 114 and the AF image pickup devices 122A and 122B are shown on one optical axis. As shown in FIG. 2, the length of the optical path for subject light entering the AF image pickup device 122A is set shorter than that of the optical path for subject light entering the other AF image pickup device 122B, and the length of the optical path for subject light entering the image pickup surface of the picture image pickup device 126 is set to an intermediate length between the lengths of the optical paths to the AF image pickup devices 122A and 122B. That is, the pair of AF image pickup devices 122A and 122B (the image pickup surfaces of the AF image pickup devices 122A and 122B) are placed at equal distances d from the image pickup surface of the picture image pickup device 126 on the front and rear sides of the same.

Thus, picture signals equivalent to those obtained by imaging subject light entering the picture taking lens 110 on the image pickup surfaces at equal distances from the image pickup surface of the picture image pickup device 126 on the front and rear sides of the same can be obtained by imaging through the pair of AF image pickup devices 122A and 122B. It is not necessarily required that the AF image pickup devices 122A and 122B be image pickup devices for taking multicolor images. In this embodiment, black and white picture signals (brightness signals) are obtained from the AF image pickup devices 122A and 122B.

Figure 6:
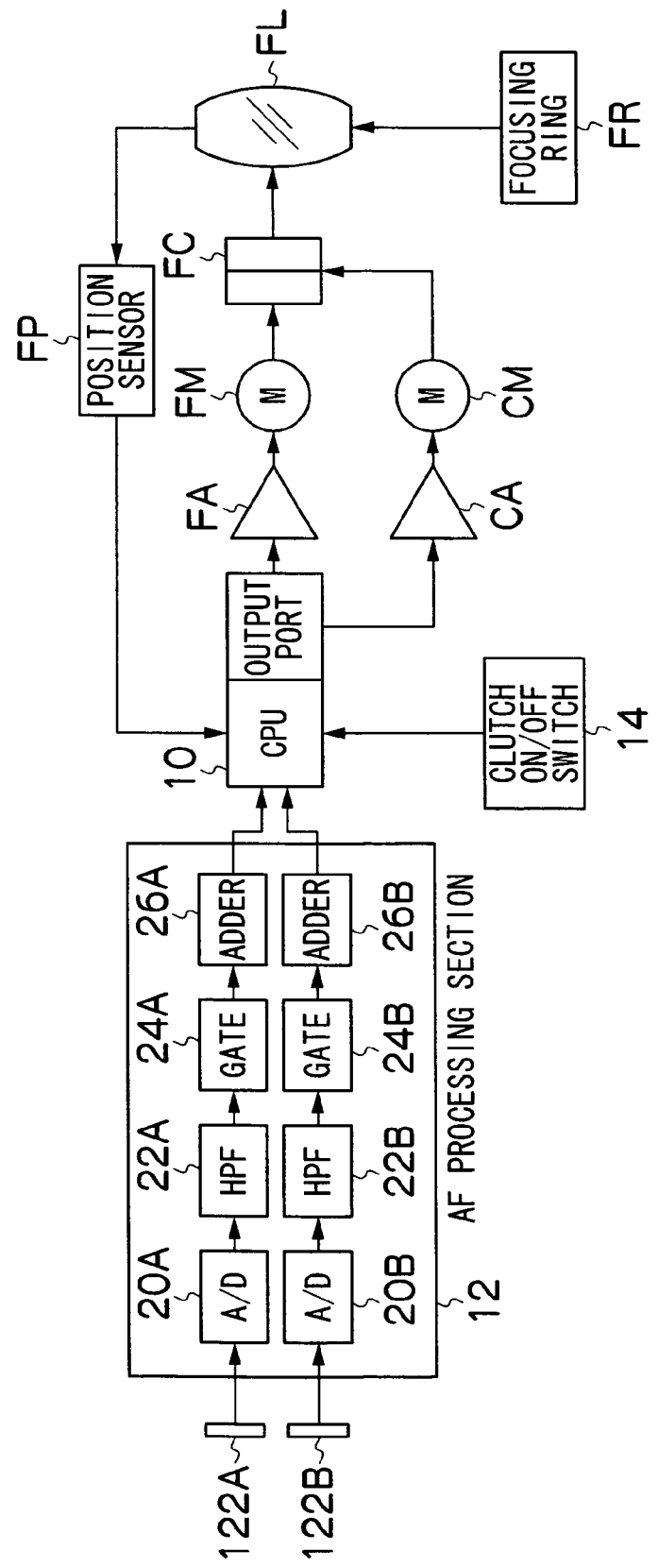
FIG. 6 is a block diagram showing the construction of a focusing drive apparatus which controls the focusing lens shown in FIG. 4.

The focusing lens FL in the picture taking lens 110 is controlled by a focusing drive apparatus arranged in the same manner as the focusing drive apparatus shown in FIG. 1. FIG. 6 shows the focusing drive apparatus in this embodiment. In FIG. 6, components identical or similar to those shown in FIG. 1 are indicated by the same reference characters. The description for such components will not be repeated.

Referring to FIG. 6, the picture signals obtained by the AF image pickup devices 122A and 122B are input to the AF processing section 12. The picture signal obtained from the AF image pickup device 122A will be referred to as "chA picture signal", and the picture signal obtained from the AF image pickup device 122B will be referred to as "chB picture signal".

In the AF processing section 12, A/D converters 20A and 20B, HPFs 22a and 22B, gate circuits 24A and 24B and addition circuits 26A and 26B for performing processings corresponding to those performed by the A/D converter 20, the HPF 22, the gate circuit 24 and the addition circuit 26 in the AF processing circuit shown in FIG. 1 are provided in correspondence with the chA and chB picture signals to obtain focus evaluation values from the chA and chB picture signals. The focus evaluation value obtained from the chA picture signal will be referred to as "chA focus evaluation value" and the focus evaluation value obtained from the chB picture signal will be referred to as "chB focus evaluation value".

The CPU 10 executes processing in the AF mode while obtaining these chA and chB focus evaluation values from the AF processing section 12.

Figure 7:
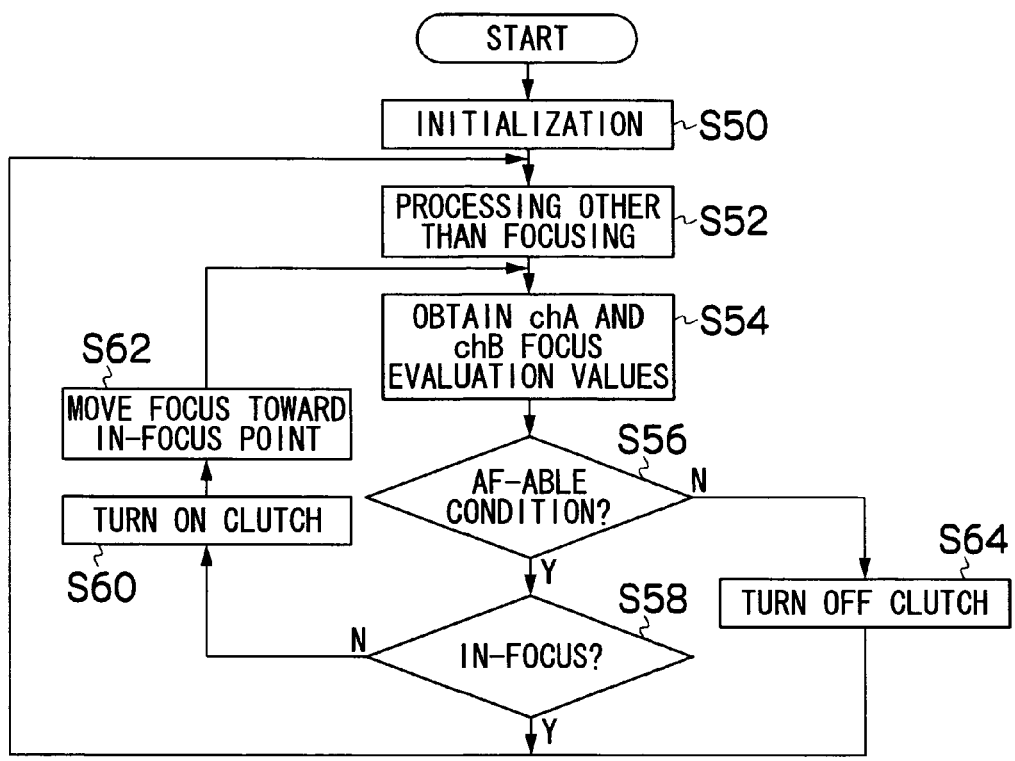
FIG. 7 is a flowchart showing a procedure of processing in the AF mode in the CPU in AF based on the optical-path-difference method.

Processing in the AF mode in the CPU 10 will be described with reference to the flowchart of FIG. 7. The CPU 10 executes processing in the AF mode when the power supply and the clutch on/off switch are on. The CPU 10 first performs necessary initialization (step S50) and thereafter executes processing other than that for focusing (step S52).

Subsequently, the CPU 10 obtains the chA and chB focus evaluation values from the AF processing section 12 (step S54) and determines whether or not the focusing system in an AF-able condition (step S56).

Figure 8:
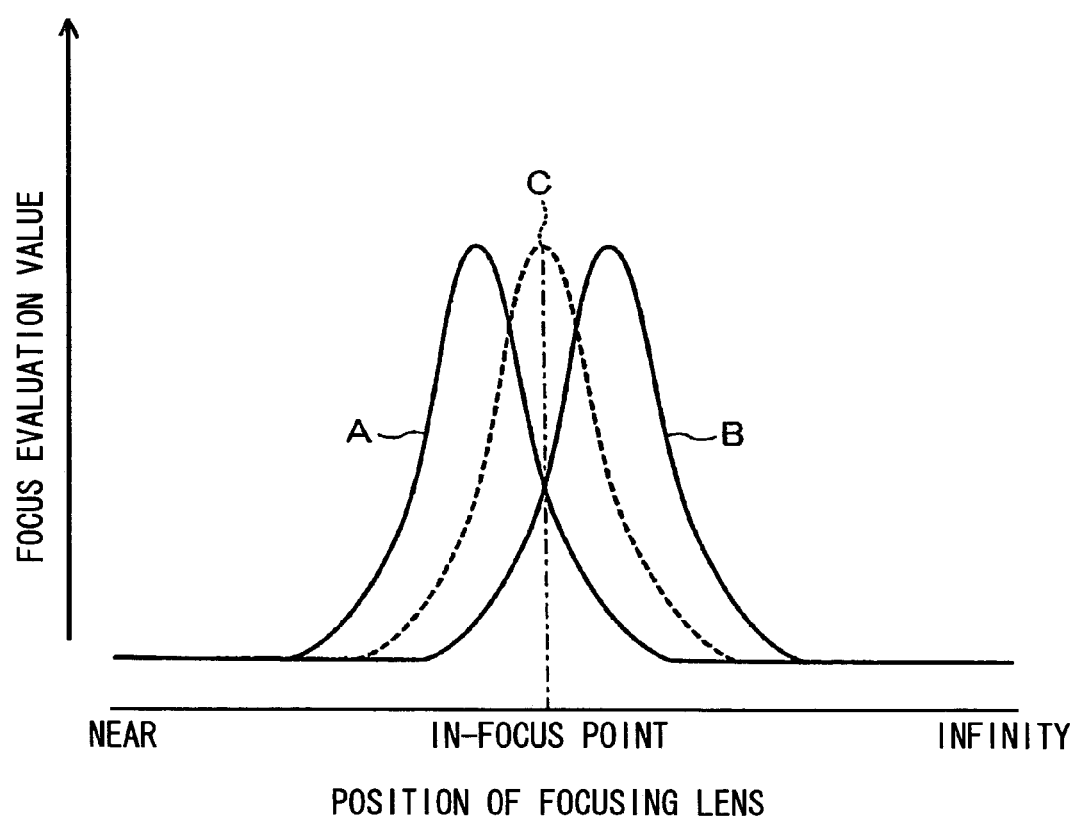
FIG. 8 is an example of a graph of chA and chB focus evaluation values obtained at each focusing lens position when the focusing lens is moved from the nearest end to the infinity end while a picture of a certain subject is being taken.

FIG. 8 is an example of a graph of the chA and chB focus evaluation values obtained at each focusing lens position when the focusing lens FL is moved from the nearest end to the infinity end while a picture of a certain subject is being taken. Curves A and B shown as solid lines in FIG. 8 respectively indicate the chA and chB evaluation values. A curve C shown as a broken line in FIG. 8 indicates the focus evaluation value assumed to be obtained from the picture signal obtained from the picture image pickup device 126.

According to this graph, the point on the curve C at which the focus evaluation value is maximized corresponds to the in-focus point. At this point, the chA and chB focus evaluation values coincide with each other. Therefore, when the chA and chB focus evaluation values coincide with each other, it is determined that the in-focus point is reached.

When the chA focus evaluation value is larger than the chB focus evaluation value, the position of the focusing lens is set on the near side of the in-focus point. In this case, it is determined that the focusing direction is the direction toward infinity.

Conversely, when the chB focus evaluation value is larger than the chA focus evaluation value, the position of the focusing lens is set on the infinity side of the in-focus point. In this case, it is determined that the focusing direction is the direction toward the nearest end.

When the difference between the chA focus evaluation value and the chB focus evaluation value is small enough to be regarded as zero, and when each focus evaluation value is equal to or smaller than a predetermined threshold value, it can be determined that the position of the focusing lens does not coincide with the in-focus point, and that the distance between the position of the focusing lens and the in-focus point is large. In this case, the focusing direction cannot be detected and it is determined that the focusing system is in an AF-unable condition. In other cases, i.e., a case where the focusing lens FL is at the in-focus point and a case where the focusing direction can be detected, it is determined that the focusing system is in an AF-able condition.

If the result of determination in step S56 is YES, that is, the result is that the focusing system is an AF-able condition, the CPU 10 then determines whether or not the correct focus has been achieved (step S58). If the result of determination is NO, the CPU 10 sets the clutch FC in the on state (step S60) and moves the focusing lens FL in the focusing direction by a predetermined amount or at a predetermined speed on the basis of the chA and chB focus evaluation values obtained in step S54 (step S62). The process then returns to step S54. If the result of determination in step S58 is YES, that is, it is determined that the in-focus point is reached, the process returns to step S52.

If the result of determination in step S56 is NO, that is, it is determined that the focusing system is in an AF-unable condition, the CPU 10 sets the clutch FC in the off state and changes the focusing mode to the MF mode (step S64), thereby enabling the operator to perform focusing by manually operating the focusing ring FR in the case where AF cannot be performed. After step S64, the CPU 10 returns the process to step S52 and repeats the processing from step S52.

While the embodiments have been described with respect to a case where MF operation is performed by using the focusing ring provided on the lens barrel, the present invention can also be applied to a case where MF operation is performed by using an operating member in a different form.

What is claimed is:

1. A focusing drive apparatus comprising:
   a focusing lens group disposed so as to be movable frontward and rearward in an optical axis direction for focusing of a picture taking lens;
   a motor for driving the focusing lens group;

a motive power transmission mechanism changed between an engaged state in which motive power of the motor can be transmitted to the focusing lens group and a disengaged state in which motive power of the motor cannot be transmitted to the focusing lens group;

an AF device which moves the focusing lens group to an in-focus position by means of the motor based on a contrast in an image of a subject taken through a picture taking optical system;

a manual operation device which enables the focusing lens group to be moved by a manual operating force;

a determination device being configured to determine whether a present focusing condition is an AF-able condition in which the focusing lens group can be moved to the in-focus position by the AF device or an AF-unable condition in which the focusing lens group cannot be moved to the in-focus position by the AF device; and a change control device being configured to set, the motive power transmission mechanism in the engaged state to enable the focusing lens group to be moved to the in-focus position by the AF device when the determination device determines that the present focusing condition is the AF-able condition, and, being configured to set the motive power transmission mechanism in the disengaged state to reduce the necessary manual operating force for moving the focusing lens group by means of the manual operation device when the determination device determines that the present focusing condition is the AF-unable condition.

2. The focusing drive apparatus according to claim 1, wherein the determination device is configured to repeat the determination and the change control device is configured to repeat the change of the motive power transmission mechanism between the engaged state and the disengaged state based on the determination.

3. The focusing drive apparatus according to claim 1, wherein based on a change in contrast in the subject image caused when the focus position of the picture taking optical system is changed, the determination device is configured to determine the present focusing condition as the AF-able condition if the direction of movement of the focusing lens for reaching the in-focus position can be detected, and to determine the present focusing condition as the AF-unable condition if the direction of movement of the focusing lens for reaching the in-focus position cannot be detected.

4. The focusing drive apparatus according to claim 1, wherein the AF device is configured to separate subject light for automatic focusing from subject light which enters the picture taking optical system to be incident on an image pickup surface of a picture image pickup device for imaging a subject image to be recorded or reproduced, to take subject images formed by imaging the subject light for automatic focusing through a plurality of AF image pickup surfaces placed at such positions that the lengths of the optical paths to the AF image pickup surfaces are different from each other, and to move the focusing lens group to the in-focus position by comparing contrasts in the subject images taken through the AF image pickup surfaces, and wherein based on the comparison between the contrasts in the subject images taken through the AF image pickup surfaces, the determination device is configured to determine the present focusing condition as the AF-able condition if the direction of movement of the focusing lens for reaching the in-focus position can be detected and to determine the present focusing condition as the AF-unable condition if the direction of movement of the focusing lens for reaching the in-focus position cannot be detected.

* * * * *